(12) United States Patent
Feyen et al.

(10) Patent No.: US 7,395,157 B2
(45) Date of Patent: Jul. 1, 2008

(54) METHOD AND SYSTEM FOR AUTOMATED LOCATION-DEPENDENT RECOGNITION OF FLOOD RISKS

(75) Inventors: Hans Feyen, Hinwil (CH); Jens Mehlhorn, Zurich (CH); Christoph Oehy, Zurich (CH)

(73) Assignee: Swiss Reinsurance Company, Zürich (CH)

( * ) Notice: Subject to any disclaimer, the term of this patent is extended or adjusted under 35 U.S.C. 154(b) by 0 days.

(21) Appl. No.: 10/582,230

(22) PCT Filed: Jun. 30, 2005

(86) PCT No.: PCT/CH2005/000365

§ 371 (c)(1),
(2), (4) Date: Jun. 9, 2006

(87) PCT Pub. No.: WO2006/002566

PCT Pub. Date: Jan. 12, 2006

(65) Prior Publication Data

US 2007/0143019 A1    Jun. 21, 2007

(30) Foreign Application Priority Data

Jun. 30, 2004   (WO) ............... PCT/EP2004/051317

(51) Int. Cl.
*G08B 21/10* (2006.01)
*G08B 31/00* (2006.01)
(52) U.S. Cl. ............................................. 702/2; 702/5
(58) Field of Classification Search ............ 702/2, 702/3, 5
See application file for complete search history.

(56) References Cited

U.S. PATENT DOCUMENTS

| | | | |
|---|---|---|---|
| 6,581,009 B1 * | 6/2003 | Smith ............................. | 702/3 |
| 6,816,878 B1 * | 11/2004 | Zimmers et al. ............ | 709/200 |
| 6,889,141 B2 * | 5/2005 | Li et al. ......................... | 702/2 |
| 6,947,842 B2 * | 9/2005 | Smith et al. .................... | 702/3 |
| 7,089,116 B2 * | 8/2006 | Smith ............................. | 702/3 |
| 2004/0133530 A1 | 7/2004 | Smith et al. | |
| 2004/0199410 A1 * | 10/2004 | Feyen et al. .................... | 705/4 |

FOREIGN PATENT DOCUMENTS

| | | |
|---|---|---|
| JP | 2002-298063 | 10/2002 |
| JP | 2002-367065 | 12/2002 |

OTHER PUBLICATIONS

Galantowicz, J. F., "High-Resolution Flood Mapping from Low-Resolution Passive Microwave Data", Geoscience and Remote Sensing Symposium, vol. 3, pp. 1499-1502, 2002.

\* cited by examiner

*Primary Examiner*—Donald E McElheny, Jr.
(74) *Attorney, Agent, or Firm*—Oblon, Spivak, McClelland, Maier & Neustadt, P.C.

(57) ABSTRACT

The invention relates to a system and method for automated location-dependent recognition of flood risks, whereas a central unit (20) comprises a lookup table (203) corresponding to a spatial high resolution grid (60/61) based on decentralized measurements of flood risk factors of a specific territory, whereas the system comprises distributed gauging stations (5/30/31/32), to measure river discharge parameters (T) within a grid cell (60/61), whereas the central unit (20) comprises a correlation-module (21) generating an event-specific averaged probabilistic water depth value (H) for an flood event based on the linked flood risk factors and the river discharge values, and whereas the system comprises an cell arbitrator module (22) accting on at least on grid-based composition module (23) according to the avaraged probabilistic water depth values (H).

40 Claims, 7 Drawing Sheets

50a
100a
250a
500a

☒ 44% A
☒ 29% B
☒ 12% C
☒ 15% D

☒ 55% E
☒ 16% F
☒ 15% G
☒ 14% H 50a
100a
250a
500a

METHOD AND SYSTEM FOR AUTOMATED LOCATION-DEPENDENT RECOGNITION OF FLOOD RISKS

This invention relates to a method and system for automated location-dependent recognition of flood risks, flood states being measured and location-dependent probability values being determined. In particular, the invention relates to a system and a method where a country-specific flood zone table, such as e.g. the First American 100-year flood zone table, is used to derive high resolution data on vulnerability factors for generalized insurance risk factors.

Today an appropriate automated flood rating system is painfully lacking. For many countries, it is hardly possible to do a technically correct flood rating and/or determination. A glance at the loss history shows that economic losses caused by flood are equally high or higher than those of earthquakes, windstorms other perils. For most of these other perils mostly exist already various rating and/or prediction and/or early warning systems. High amounts of money, industrial power and time are lost by flood events. Additionally, with the trend of increasing insurance penetration for floods, the insurance and re-insurance industry is affected ever more by flood losses. To extend the early warning and flood rating to detailed and even facultative business, however, the threat of immense data amounts has to be coped with. This is done by completely new concepts on the hazard event set as well as on the system and/or method side. FIGS. 2 and 3 show two diagrams which illustrates in the observation period 1 Jan. 1997-31 Dec. 2000; flood accounts for 55% of all natural peril-induced damage to property cooperate business (FIG. 2) and for 44% of all natural peril-induced damage to industry business (FIG. 3). The reference numeral A/E shows flood related losses, B/F storm related losses, C/G earthquake/volcano related losses and D/H other losses.

One of the objects of the invention is to provide a new approach to creating a stochastic event set. The main benefit of the new approach has to be the economic use of storage, which also positively influences the performance of the rating. Instead of storing water depths for each of the tens of thousands of events, e.g. only a flood frequency map or something similar should be stored at a highly detailed level (90 m resolution). The event return periods should be generable and storable on an aggregated high-resolution grid level for the territory.

It is well known that floods cause equally high or higher economic losses than storm or earthquakes. Considering losses on industrial books, flood losses typically exceed by far earthquake or storm losses. FIG. 1 shows in the observation period 1 Jan. 1997-31 Dec. 2000, that flood accounts for 55% of all natural peril-induced damage to property corporate business and for 44% of all natural peril-induced damage to industry property business of a specific reinsurance company. This concerns not only industry itself, but with the permanent rise of the flood insurance penetration, in addition to a concentration of values in areas prone to flood, the insurance and re-insurance industry is affected ever more by flood losses. However, flood rating has been badly neglected, despite the fact that often detailed information (address) on is the ceded risks is available. This is mainly owing to the fact that no efficient flood rating system is available. Ideally, such a system is made up of two components: first, it needs a street address geo-encoding to translate the addresses into a lat/lon and to make a lookup on the existing flood zones. Second, based on the lat/lon and flood zone information, a fully technical risk rating (including event-based capacity calculation) can be performed.

The advantages of being able to do a correct technical risk rating for flood (e.g. on an Aggregated Loss Modelling (ALM) or Detailed Loss Modelling (DLM) basis) are plenty: (i) Better risk quantification: both components of an automated flood risk system will allow better estimatation of the risk exposure of a detailed property schedule. It will be possible to reduce the number of "unexpected losses" e.g. to insurance, reinsurance or other industry. The improved risk quantification is enhanced by taking into account the TC-Flood correlation; (ii) Better structuring of flood-exposed programs or portfolios: since the contribution of every single risk to the expected losses can be quantified, it is possible to determine site-dependent sub-limits or even to exclude certain sites from flood coverage; (iii) Essential improvements in flood risk assessment: It will be the first time in industry that a detailed and fully stochastic flood rating system is achieved. This can have a positive effect on the positioning of industry and/or insurance and re-insurance in the market, and can generate new business opportunities; (iv) The availability of a detailed automated flood rating system will allow better qualification of property schedule data, e.g. in relation to identifying which policies have a flood coverage with the insurance industry; (v) Improved determination of capacity requirements: With a new event set approach it will be possible to allocate expected losses consistently to a specific contract.

In the state of the art the US Geological Survey (USGS) National Elevation Dataset (NED) has been developed by merging the highest-resolution, best-quality elevation data available across the United States into a seamless raster format. NED is the result of the maturation of the USGS effort to provide 1:24,000-scale Digital Elevation Model (DEM) data for the conterminous US Projection. NED has a resolution of one arc-second (approximately 30 meters) for the conterminous United States. In the NED assembly process the elevation values are converted to decimal meters as a consistent unit of measure, North American Datum of 1983 (AND83) is consistently used as horizontal datum, and all the data are recast in a geographic projection. AND83 is based on the Geodetic Reference System of 1980 (GRS 80) ellipsoid that was developed to best-fit sea level over the entire earth. In the state of the art there can also be found the National Landcover Dataset (NLCD). The National Land Cover Characterization project was created in 1995 to support the original Multi-Resolution Land Characterization (MRLC) initiative and fulfill the requirement to develop a nationally consistent land cover data set from MRLC data called National Land Cover Data 1992 (NLCD 92). This culminated in the September 2000 completion of land-cover mapping using a modified Anderson level II classification for the conterminous United States. The source data is the Landsat™ data for the years close to 1992. The National Land Cover Data (NLCD) is a 21-class land cover classification scheme applied consistently over the United States. In addition to satellite data, scientists used a variety of supporting information including topography, census, agricultural statistics, soil characteristics, other land cover maps, and wetlands data to determine and label the land cover type at 30 meter resolution. The spatial resolution of the data is also in geographic projection, AND 83. The relevant classes for flood assessment are the following: A) Water: (11) Open Water, (12) Perennial Ice/Snow; B) Developed: (21) Low Intensity Residential (Discontinuous Urban) including areas with a mixture of constructed materials and vegetation, where constructed materials account for 30-80% of the cover and vegetation for 20-70%. These areas most commonly include single-family housing units and population densities lower than in high intensity residential areas. (22) High Intensity Residential (Continuous Urban) including highly developed areas where people reside in high numbers. Examples include apartment complexes and row houses. Vegetation accounts for less than 20% of the cover and constructed materials for 80-100%. (23) Commercial/Industrial/Transportation (Industrial) including infrastructure (e.g. roads, railroads, etc.) and all highly developed areas not classified as High Intensity Residential. The growing need for land cover and other geospatial data within the federal government culminated in reforming the MRLC Consortium again in 2000 (MRLC 2001), with a second generation national land-cover data set to be developed from the data called National Land Cover Data 2001 (NLCD 2001). The production of NLCD 2001 will be implemented in a phased approach using mapping regions developed by USGS. Full production development is anticipated to begin in 2002, with completion targeted for 2004. Unfortunately, this data will not be available before 2005.

Further there is the National Hydrography Dataset (NHD) in the state of the art, which is a set of digital spatial data that contains information about surface water features such as lakes, ponds, streams, rivers, springs and wells. The National Hydrography Dataset (NHD) is a newly combined dataset that provides hydrographic data for the United States on a hydrologic unit basis (8-digit number). It is currently based on the content of the USGS 1:100,000-scale data, giving it accuracy consistent with those data. The horizontal positional accuracy is such that 90 percent of points are within 50 meters of their true position. The locations of points, lines, and the boundaries of areas are encoded using geographic (longitude-latitude) coordinates. The horizontal datum is the North American Datum of 1983 (AND83). In the state of the art the FloodMap from First American provides the most accurate, up-to-date flood hazard zones for risk assessment, insurance and re-insurance. This digital map database is based on Flood Rate Insurance Maps (FIRMs) prepared by the Federal Emergency Management Agency to depict flood risks in support of the congressionally mandated National Flood Insurance Program (NFIP). The result of engineering flood insurance studies, FIRMs are used to implement floodplain management measures to reduce flood risks to communities and to perform flood insurance policy rating. These FIRMs depict Special Flood Hazard Areas that are subject to inundation for both the 100-year flood (national standard for flood insurance) and the 500-year flood zones. The First American FloodMap$^{SM}$ database has been cleaned and corrected to reflect information as shown on these paper FIRMs. National, State, Territory and County First American Flood Hazard Certification currently has 3'100+ counties of digital Flood Insurance Rate Maps. The county level coverage represents over 99% of the U.S. population. FloodMap reflects all FEMA revisions (over 12000 a year). The entire database is refreshed quarterly to ensure accuracy, currency and investment value. The dataset is provided in geographic coordinates based on AND83. In the dataset the coastal floodways and floodplains (flood zone code "V*") are considered in a separate storm surge risk evaluation. Finally, there is a data source for the USGS Daily Values publication, the so-called USGS WATSTORE database in the state of the art. It includes stream flow and related stream data with remarks (i.e. stream flow, stage, water temp., lake level, reservoir storage, level below surface and more). It includes 38,972 stations covering a record period of maximally from 1781 to the present. It contains raw data, daily, monthly and exceedance statistics. The datum for the coordinates of the gauging stations (6) is also AND83.

It should be pointed out that, besides the method according to the invention, the present invention also relates to a system and a computer program product for carrying out this method.

In particular the objects are achieved through the invention in that for automated location-dependent recognition of flood risks, flood states being transmitted to a central unit and location-dependent flood probability values being determined, in that the central unit comprises a multi-dimensional lookup table corresponding to a spatial high resolution grid based on decentralized measurements of flood risk factors of a specific territory whereas the flood risk factors (P) being associated with the grid indicating the averaged flood frequency and/or susceptibility to flooding within a grid cell, in that the system comprises distributed gauging stations, whereas river discharge parameters (T) are measurable by the distributed gauging stations within a grid cell and transmitted over a network to the central unit, the river discharge parameters comprising at least values for return period and/or intensity of measured events, in that the central unit comprises a correlation-module generating an event-specific averaged probabilistic water depth value (H) for an flood event based on the linked flood risk factors and the river discharge values, and associating the probabilistic water depth value (H) to the corresponding grid cell. The system can comprise an cell arbitrator module accting on at least on grid-based composition module according to the avaraged probabilistic water depth values (H). The grid-based composition module can e.g. comprise at least an early warning system signaling flood risk in the appropriate cell and/or an automated damage prediction systems and/or damage covering systems for land-based installations based upon at least the flood risk factors. The grid-based composition module also can comprise at least an optimization and/or control module for protection installation of technical and/or industrial facilities based upon at least the flood risk factors.

Under spatial high resolution a resolution with a cell size below 1 km$^2$ is understood, in particular a cell size below 10'000 m$^2$. One of the advantages of the invention is that a much more economic use of storage can be achieved, which also essentially influences the performance of the rating. For example, instead of storing water depths for each of tens of thousands of events or more, only one flood frequency map is stored at a highly detailed level (90m resolution). The event return periods are generated and stored on cell level. Both pieces of information are combined to calculate the water depth at a location for all the events. Additionally, a better structuring of flood-exposed programs or portfolios can be achieved. Since the contribution of every single risk to the expected losses can be quantified, it is possible to determine site dependent sub-limits or even to exclude certain sites from flood coverage. Further essential improvements in flood risk assessment can be provided: It will be the first time in industry that a detailed and fully stochastic flood rating system is achieved. This can have a positive effect on the positioning of industry and/or insurance and re-insurance in the market, and can generate new business opportunities. Another advantage of the invention is the availability of a detailed automated flood rating system, which will make it possible to require better quality property schedule data, e.g. in relation to identifying which policies have a flood coverage with the insurance industry. Finally, improved capacity allocation and determination can be done: With a new event set approach, it will be possible to allocate expected losses consistently to a specific contract. The correlation module can e.g. comprise at least five adaptable correlation parameters Xi, x2, . . . , x5, whereas the adaptable parameters can e.g. be correlated by

For flood cell zones along a coast located at different heights in meters above sea level, different correlation modules can e.g. be used. For example, for flood cell zones along a coast located lower than 10 m above sea level can be determined by a specific correlation module. The determination of the flood cells along a coast can e.g. be based additionally upon storm surge events. The determination of the flood cells along a coast can also comprise e.g. a Sea, Lake and Overland Surges from Hurricanes (SLOSH) method.

In an embodiment of the invention, a linking module comprises at least one adaptable event factor providing the spatial and/or temporal correlations for the discharge measurements of different gauging stations 6. This embodiment has inter alia the advantage that the distribution of return periods between the single cells can show spatial and temporal correlations determined from discharge measurements of gauging stations 6, which can be taken into account by the at least one adaptable event factor.

In another embodiment of the invention, the river discharge parameters (T) are determined by measurements in a low spatial resolution in relation to the grid of the flood risk factors. This embodiment has inter alia the advantage that the use of storage can further be economized, which also essentially influences the performance of the rating. For instance, instead of storing water depths for each of the tens of thousands of events or more, only one flood frequency map is stored at a highly detailed level (90 m resolution). The event return periods are generated and stored on cell level. Both pieces of information are combined to calculate the water depth at a location for all the events.

In still another embodiment according to the invention, the resolution of the grid cells is below 10'000 m² for the diameter. It must be pointed out that, in principle, it is possible to set the resolution to an arbitrary small cell size. However, the resolution is limited e.g. by the inherent errors of the parameters. This embodiment has, among other things, the advantage that the desired flood parameters can be properly determined by the system for a specific cell and/or site size.

In a further embodiment according to the invention, the flood risk factors (P) are derived based upon at least geomorphologic parameters. The geomorphologic parameters comprise e.g. horizontal distance and/or elevation difference to the next river and/or drainage area. This embodiment has inter alia the advantage that it comprises a method which is known in the state of the art, and e.g. errors can be easily estimated. So the flood risk factors (P) can e.g. be derived by an interpolation module based upon a country-specific flood zone table depending on horizontal distance and/or elevation difference. For the United States of America the country-specific flood zone table can comprise, for example, the First American 100-year flood zone table.

In an embodiment according to the invention, the vulnerability factors are determined based upon historical dataset of corresponding insurance risk portfolios, and a generalized insurance risk is automated derivable from the vulnerability factors. This embodiment has, among other things, the advantage that a fully automated system for determining the vulnerability factors of places and sites can be provided. This has not been possible up to now in the state of the art.

In another embodiment according to the invention, the system is accessable over a network by client nodes, whereas the system comprises a billing module with a billing gateway interface for access to the central unit first call datail records of a client node being transmittable from the central unit to the billing module. By means of a proxy module of the system second call detail records of the client node also can be downloadable from the central unit by means of the proxy module at least the identity of the client node and/or duration of the access to the central unit and/or service being able to be captured and able to be passed on to the billing module. By means of the billing module of the system TAP files corresponding to the obtained service are able to be generated, an these are transmittable, together with billing instructions, to a clearing module, the billing instructions including at least user-specific and/or service-provider-specific billing data. This embodiment has, among other things, the advantage that a full billing of the use of the system for third parties can be provided.

Additional features and advantages will become apparent to those skilled in the art upon consideration of the following detailed description of illustrative embodiments exemplifying the best mode of carrying out the method as presently perceived.

The present disclosure will be described hereafter with reference to the attached drawings which are given as non-limiting examples only, in which:

FIG. 1 gives an shematic overview of an embodiment of the invention.

FIGS. 2 and 3 show two diagrams which illustrates in the observation period 1 Jan. 1997-31 Dec. 2000; flood accounts for 55% of all natural peril-induced damage to property cooperate business (FIG. 2) and for 44% of all natural peril-induced damage to industry business (FIG. 3). The reference numeral A/E shows flood related losses, B/F storm related losses, C/G earthquake/volcano related losses and D/H other losses.

FIG. 4 shows a diagram illustrating a flood frequency map (p-map) based on extended FEMA 100-y flood zone. The interpolation depending on horizontal and vertical distance to next river to get other return periods. The reference numeral 1 is a 50-y flood zone, 2 is a 100-y flood zone, 3 is a 500-y flood zone and 4 is a river.

FIG. 5 shows a diagram illustrating an example of flood frequency map, where as the spatial resolution is 90 m grid cell size for the chosen map.

FIG. 6 is a diagram which illustrates gauging stations 5 with 25 years of records used for event set generation. This example shows used gauging stations 5 in North Caroline (US) where the determination is done based upon daily stream flow records.

FIG. 7 is a diagram which illustrates the example event set with return periods per cell for the biggest event in North Carolina.

FIG. 8 shows a diagram which illustrates the relation between flood frequency (P-value), water depth (H) and even set (return period T). The relation is plotted on FIG. 10 with the black dots indicating the values related to 100-year and 500-year flood zones and 100, respectively 500-year flood events.

FIG. 9 shows a diagram which illustrates the same relationship as in FIG. 8 but with different axes, representing the relationship between flood exposure, return period and water depth. It can be noted that for this example a flood event with a return period of 10 years, can only affect locations with P-values higher than 0.82 with water depths ranging up to 0.8 m. For a 100-year flood this range varies from 0.0 m (P<0.54) up to 2.2 m (P=1).

Figure 1:
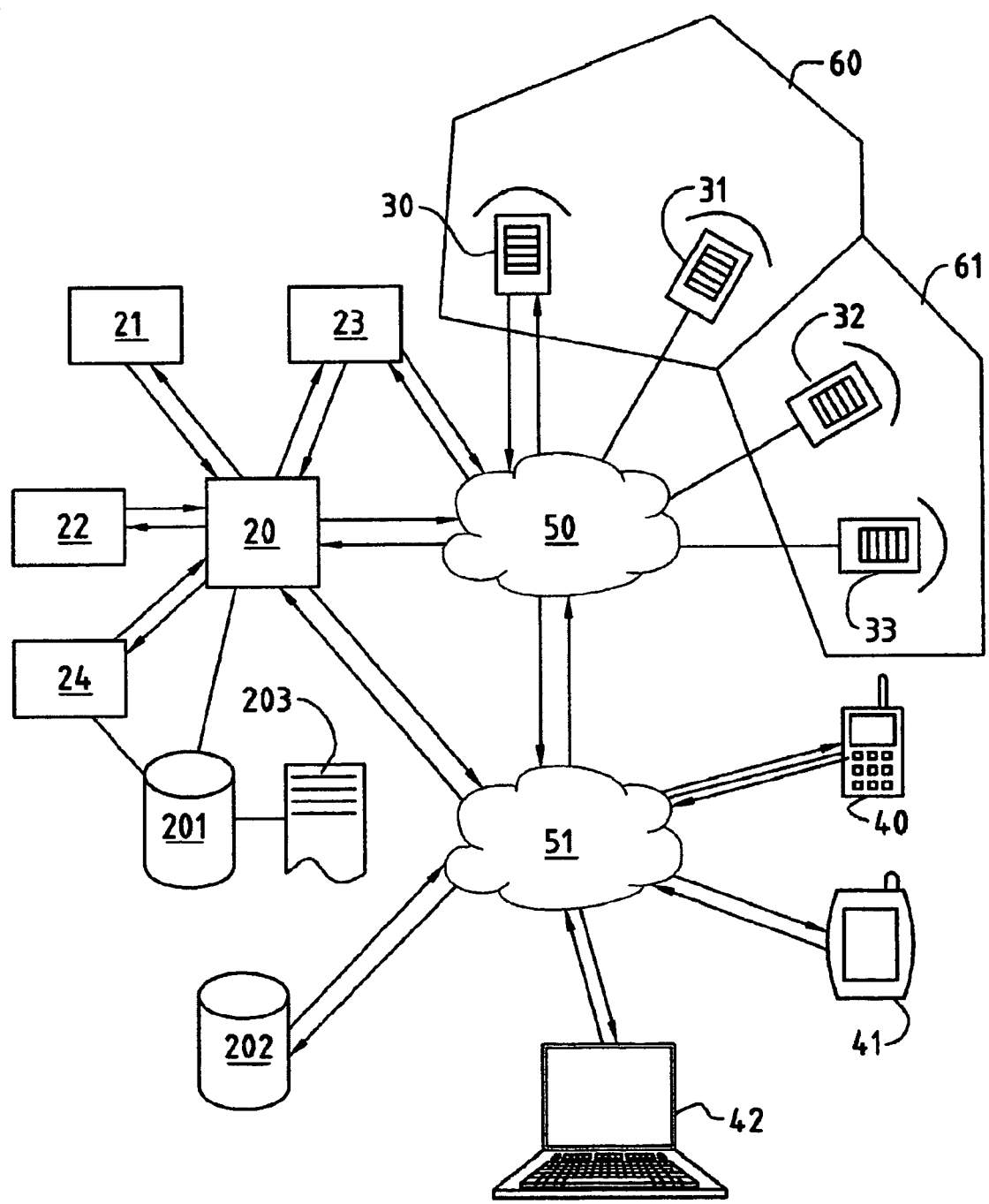
Figure 2:
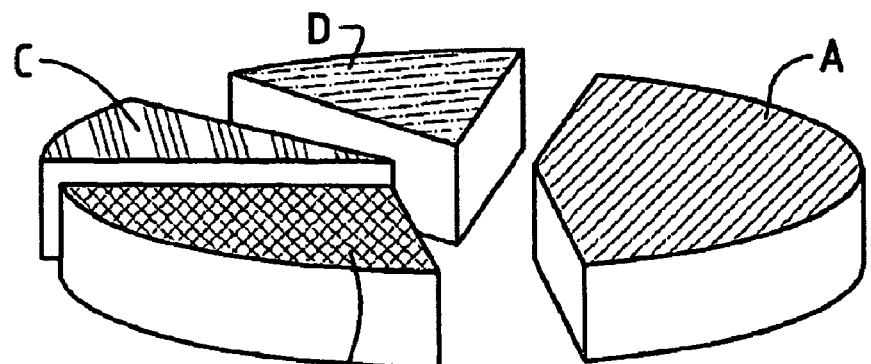
Figure 3:
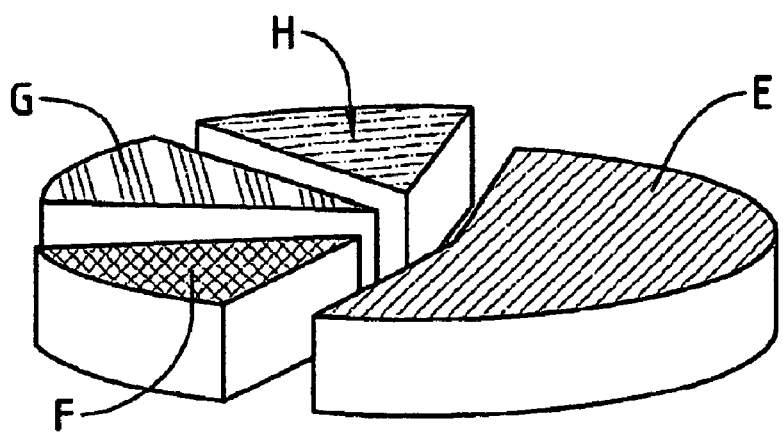
Figure 4:
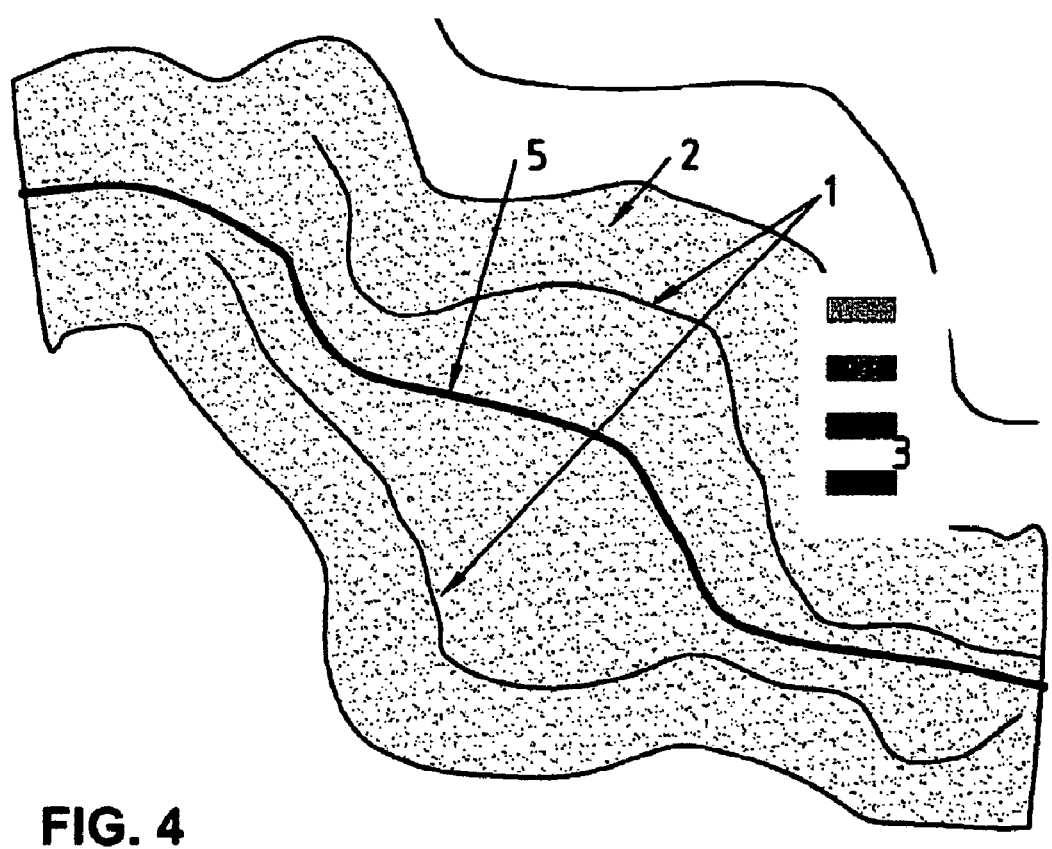
Figure 5:
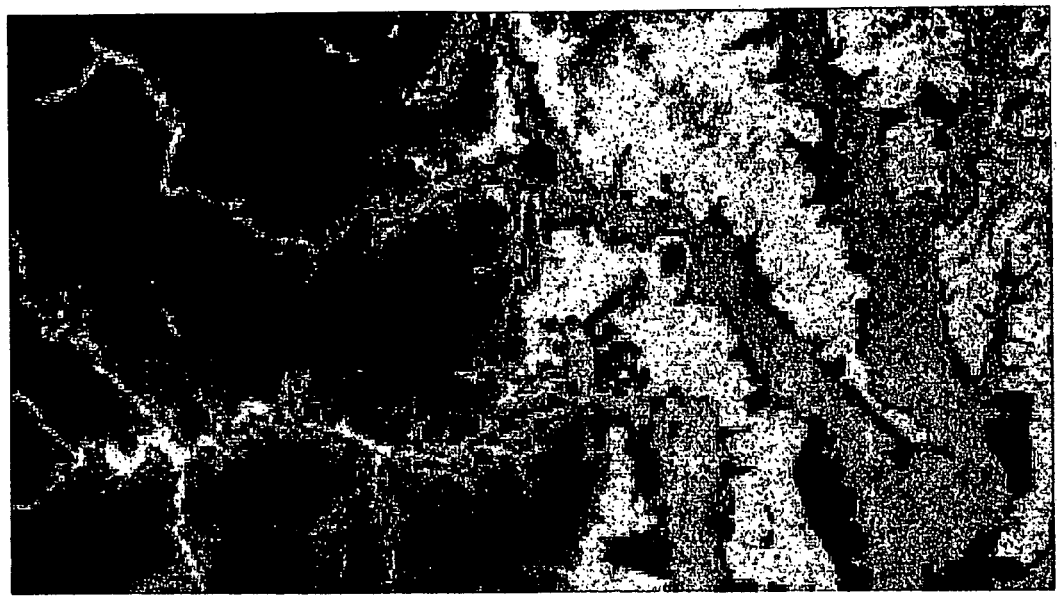
Figure 11:
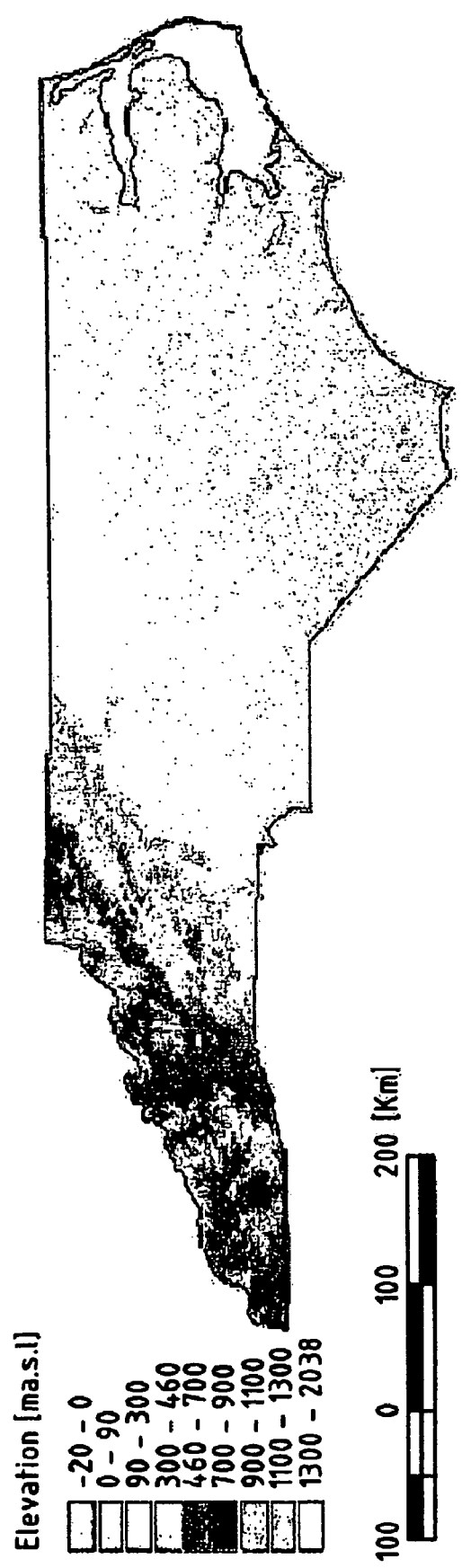
FIG. 11 shows an elevation model of North Carolina (US) with the zones mentioned below. The elevation is given in meter above sea level (a.s.l.).

The overall operation, method and system of one embodiment of the subject method is discussed in the following. The reference numeral 20 in FIG. 1 refers to a central unit 20 having the necessary infrastructure, including hardware and software components and/or units, to achieve a described system and/or method according to the invention. The system and method allow creation of a stochastic event set. One of the main benefit of the new approach is the highly economic use of storage, which directly influences the performance of the system and its operation. Instead of storing water depths for each of tens of thousands of events, only one or very few flood frequency maps have to be stored at a highly detailed level (90 m resolution). The event return periods are generated and stored on the desired cell level. Both pieces of information are combined to calculate the water depth at a location for all the events. In this embodiment variant, a central unit 20 comprises a multi-dimensional lookup table 203 corresponding to a spatial high resolution grid 60/61 based on decentralized measurements of flood risk factors of a specific territory whereas the flood risk factors (P) being associated with the grid indicating the averaged flood frequency and/or susceptibility to flooding within a grid cell 60/61. As an example of the flood risk factors, i.e. a flood frequency map, e.g. the state of North Carolina (NC)/United States (US) can be chosen as prototype territory. North Carolina has a surface of 140'000 km$^2$ (for comparison mainland United Kingdom has 220 000 km$^2$) and 6.8 Mio citizens. The extent of North Carolina is 850 km in west-east direction and 305 km in north-south direction. The highest point culminates on Mount Mitchell at 2037 meters above sea level. The Atlantic coast is 484 km long. The topography is divided into three distinct regions: the Atlantic coast plain (2/3) up to 80 km into the inner land (elevation <90 m a.s.l.), the Piedmont Plateau (elevation 90-460 m a.s.l.) and the Appalachian (elevation >460 meters above sea level). FIG. 11 shows an elevation model of NC with the mentioned zones. Between Cape Hatteras and Cape Fear some regions are often affected by hurricanes. For the flood frequency map (or P-map) the grid can e.g. consist of values between 0 (never flooded) and 1 (always flooded) indicating the susceptibility to flooding. In this example the values can e.g. be derived from the First American 100-year flood zones, the digital elevation model and the river network. As mentioned, the flood frequency map, i.e. the flood risk values associated with the grid, can e.g. consist of values between 0 (never flooded) and 1 (always flooded) indicating the susceptibility to flooding of each location (latitude, longitude). The values of the flood risk factors (P) between 0 and 1 can be related directly to flood frequency, for example P=0.58 stands for the 100-year flood zone. Of course, other flood zones could be chosen as e.g. flood zones with a certain other return period (50-, 100-, 250-, 500-years). The flood zones can be determined based on geomorphologic parameters such as the horizontal distance and elevation difference to the next river and/or the drainage area. The data in this example were e.g. validated with FEMA data from the USA and proofed good results in several countries (CZE, UK, SVK, BEL). FIG. 4 shows a diagram illustrating a flood frequency map (p-map) based on extended FEMA 100-y flood zone. The interpolation depending on horizontal and vertical distance to next river to get other return periods. The reference numeral 1 is a 50-y flood zone, 2 is a 100-y flood zone, 3 is a 500-y flood zone and 4 is a river. In the example of the embodiment, the First American 100-year flood zones are used to interpolate by an interpolation module depending on the horizontal distance and elevation difference of the cell. The interpolation module can be achieved through hardware and/or software. An additional advantage of taking the 100-year flood zones for calibration is that flood protection measures will be automatically taken into account. The processing steps can comprise e.g. the following steps: (i) Prepare National Elevation Dataset: Merge, project and fill grid; (ii) Prepare First American FloodMapSM Dataset: Select zones, project, clean and expand grid by 600 m (the size of the buffer will be adapted depending on the regions), which results in a extended or buffered 100-year flood zone, (iii) Prepare National Hydrography Dataset: Select rivers, project grid. (All the datasets contain the elevation data and can e.g. be saved to a storage module); (iv) Generation of p-value map: With a appropriate processing module the input files are then processed to result in a grid with the extend of the buffered flood zones with p-values. a) Nearest neighbor lookup of buffer grid points on river network: Determination of horizontal distance and elevation difference. b) Nearest neighbor lookup of grid point at 100-year flood zone border on river network: Determination of horizontal distance and elevation difference. c) Determine calibration parameter with MARS formula, d) Smoothing of calibration parameter. e) determine p-value and e.g. save them into to storage module. (v) Post-processing: Aggregate, clean and reproject grid to geographic coordinates.

The quality of the p-value map can e.g. be checked by a test portfolio with known locations. These locations can then be checked with both grids (First American flood zone and p-value map). The results for this example are illustrated in Table 1, where all locations lying within the First American 100-year flood zones are taken and checked against the p-value map. As can be seen, 73% of all checked locations in North Caroline (NC) are also found in the 100-year flood zone of the p-value map, and 97% are in 500-year flood zones of the p-value map. It is important to note that the flood zone along the coast can often include storm surge zones, and it is clear that in these areas the presented method is not well adapted (no rivers available). Therefore a second check can be made, taking only the locations above 10 meters above sea level, and in that case 92% of the locations from the p-value map fall into the 100-year flood zone.

TABLE 1

Comparison of locations lying in First American 100-year flood zone with those from p-value map.

| Flood zone | All locations within First American 100-year flood zone | Locations within First American 100-year flood zone (>10 m. a.s.l.) |
| --- | --- | --- |
| 50-year | 73 (47%) | 39 (74%) |
| 100-year | 112 (73%) | 49 (92%) |
| 250-year | 146 (95%) | 52 (98%) |
| 500-year | 149 (97%) | 53 (100%) |

Over the whole of NC, the area affected by a 100-year flood determined by the system from the p-value map underestimates the First American flooded area by only 2.6%. Comparing the two datasets, it can be seen for this example that in the flat coastal region the flooded area is rather underestimated, which is due to the fact that storm surge is not taken into account yet. A slight overestimation exists in the central part of NC, but this is not significant. The final p-value map has in this embodiment example a cell size of 90 m, which is precise enough taking into account the precision of the geo-encoding. By that way, the total amount of data can be divided by a factor 9. The total size of the p-value map (p>0.2) for NC includes 5.2 mn cells. Taking the whole USA, this would result in 360 Mio cells, assuming that the same percentage of area is flooded.

Figure 6:
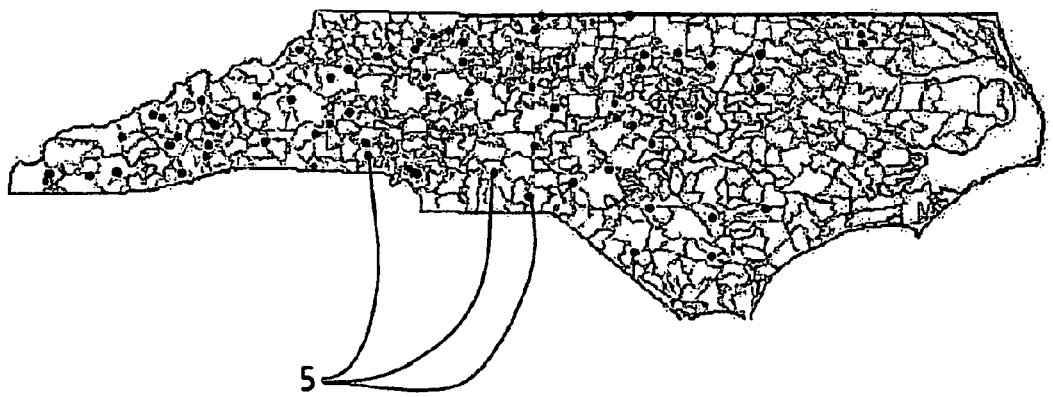

Further the system comprises distributed gauging stations 6/30/31/32. River discharge parameters (T) are determined by the distributed gauging stations 6/30/31/32 within a grid cell 60/61 and transmitted over a network 50 to the central unit 20, the river discharge parameters comprising at least values for return period and/or intensity of measured events. For this example the river discharge parameters (T) are also called event set T-table. The T-table comprises for the example the return periods of 1183 flood events affecting the 1082 cell zones of North Carolina. A probabilistic event set is derived from the statistics of 74 river discharge gauging stations 6/30/31/32. Again, the event set specifies the return period or intensity of one event in a given cell of the grid. The distribution of return periods between the cells can take into account the spatial and temporal correlations determined from discharge measurements of gauging stations 6/30/31/32 covering a range of 25 years from 1977-2002. Totally, 74 stations fulfilled this requirement for the example of North Carolina. For the whole USA, approximately 3000 stations can be used. It is clear that not only head catchment gauging stations 6/30/31/32 can be used for the system, but also stations at main rivers. It has to be noted that only few stations were available in the coastal area as can be seen on FIG. 6.

Figure 7:
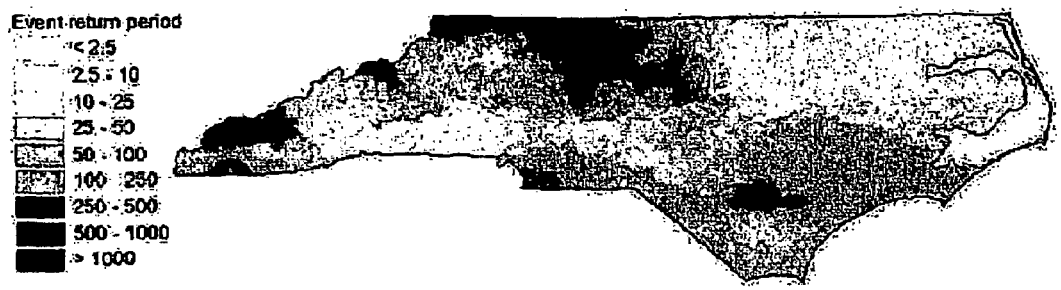

The reason for the selection of return period as a measure of intensity lies mainly in its relative weak variation along the river network, i. e. the return period between adjacent cells of the grid on a river varies "smoothly". FIG. 7 shows the distribution of return periods on cell resolution for the biggest event in the North Carolina event set. The chosen definition of events through return periods further allows real events to be easily included by the means of extreme value analysis of the time series, for example the 1993 flood. Real events also provide the possibility, on the one hand, of a direct comparison with possible loss data and, on the other hand, a plausibility check of the probabilistic events. Finally, post-event analysis could be made by downloading the newest discharge measurements and analyzing them with the past time series.

The central unit 20 further comprises a correlation-module 21. An event-specific averaged probabilistic water depth value (H) for an flood event based on the linked flood risk factors and the river discharge values is generated by the correlation module 21, and associating the probabilistic water depth value (H) to the corresponding grid cell 60/61. The event-specific averaged probabilistic water depth value (H) for an event is in this example the desired location-dependent flood probability value. The correlation module 21 can e.g. be achieved through hardware and/or software. To link the flood frequency map (p-value map) and the event set (return period T) with the hazard, i.e. water depth H, a relationship indicating a mean average water depth as a function of these two parameters is necessary. To determine such a relationship e.g. an analysis based on the probabilistic flood event set of a known territory can be done. In this example, a probabilistic flood event set of the UK was chosen. The chosen event set consists of 973 flood maps indicating the water depth at each flooded cell with a resolution of 50 m. For the analysis, the unprotected event set was used. In order to perform the analysis, the flood frequency P-value of each cell had to be known. Therefore, the P-map determined by the system was taken as a mask. Specifically, this means that for each event or flood footprint, the water depths of all cells with a certain P-value were collected. This collection allows e.g. for a classification into 8 water depth classes (0-4.0 m) and 16 p-value classes 0.2-0.9. If the number of occurrences in each class is divided by the total sum of observations, the relative frequency f, can be calculated as $$f_i = \frac{Numbe of occurrencs B' n class /}{\sum_i NumbeD foccurrencs an class /}$$

and the corresponding return period is $$T_i = \frac{1}{f_i}.$$

This method can also be explained by the fact that, with a high number of events and flooded cells, this frequency distribution of water depths and P-values becomes an intrinsic function which is independent of the number of events. Or, in other words, if you add 10 additional events, the relative frequency will not change, and still represents the occurrence frequency.

To give an analytical expression for the relationship, the values of the example were fitted to the following function $$T = exp e \cdot 9 + 0.5 \cdot H - 8.0 \cdot P + 1.2 \cdot H \cdot P)$$

or $$H = \max\left(\frac{8 \cdot P - 8.9 + \log T}{1.2 \cdot P + 0.5}, 0\right) \text{ for } T > 2.5$$

Figure 8:
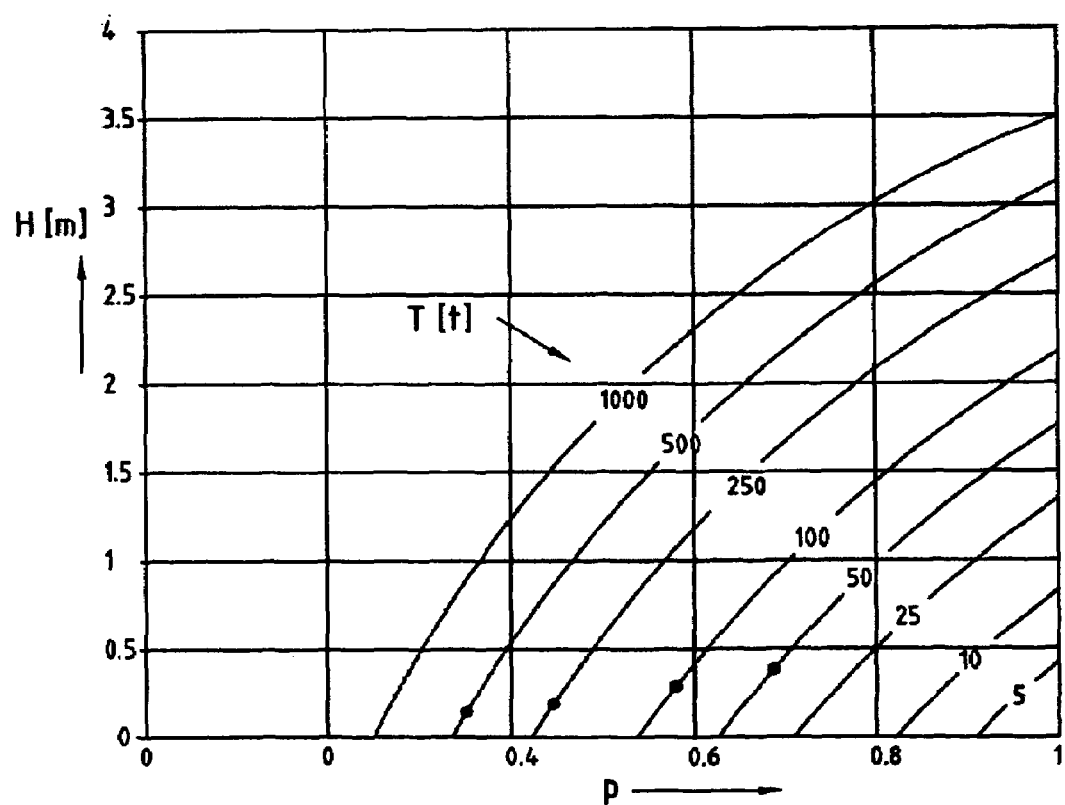
Figure 9:
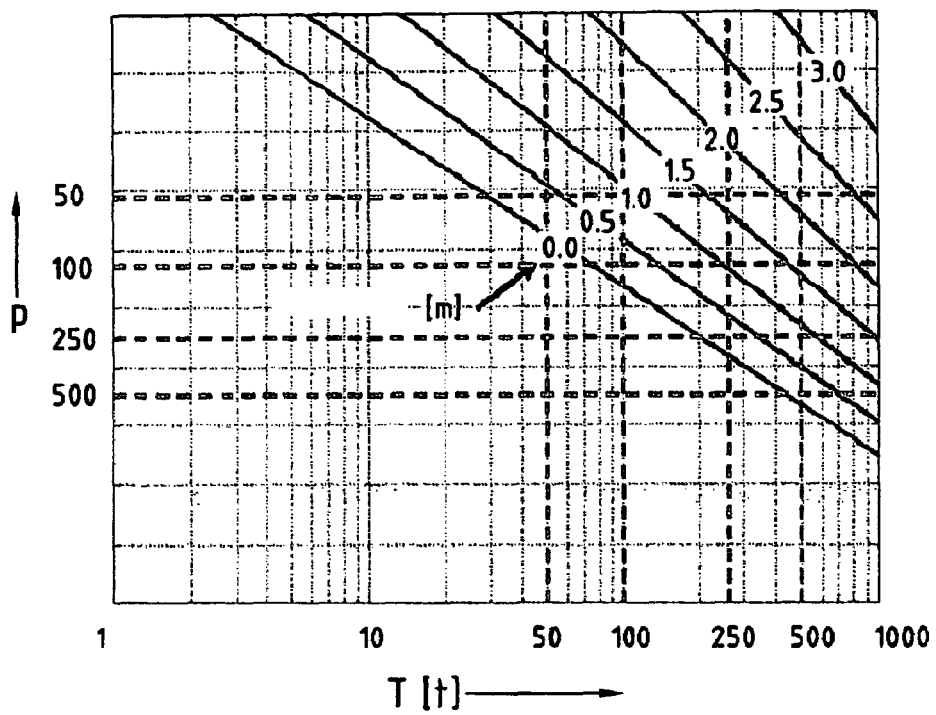
Figure 10:
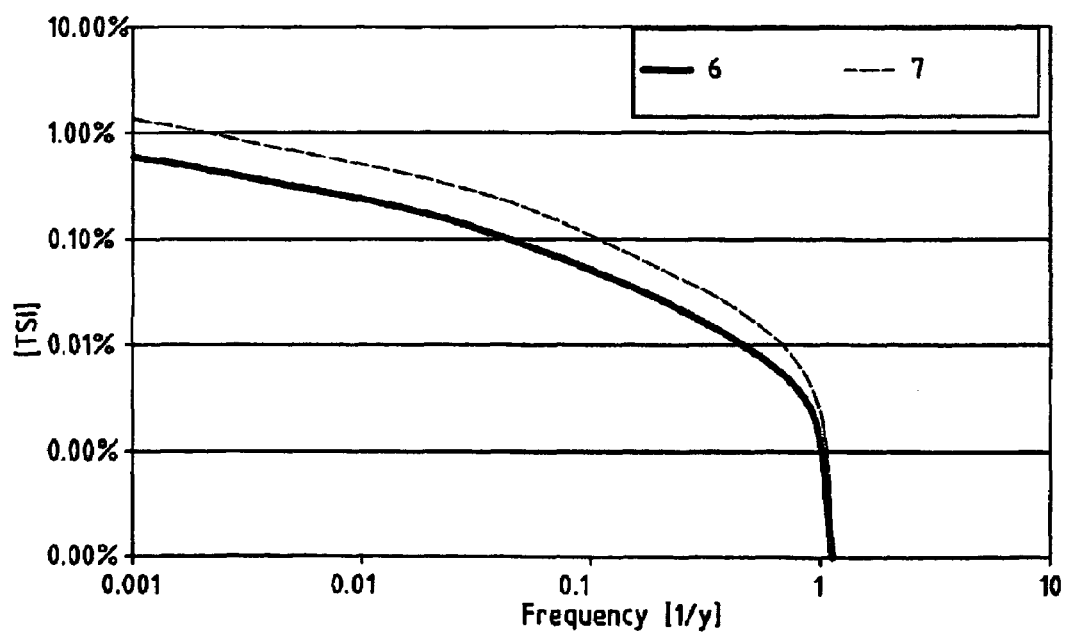
FIG. 10 shows a diagram illustrating the loss in relation to the frequency of the event for a random portfolio 6 of industry, residential and/or buildings etc. and a wind portfolio on the example of North Carolina (with vulnerabilities).

The function is plotted on FIG. 8 with the black dots indicating the values related to 100-year and 500-year flood zones and 100, resp. 500-year flood events. The P-values for the 100-year (P>0.58) and 500-year flood zone (P>0.35) were given by the calibration of the MARS model to the FEMA flood zones of several regions in the U.S.A. Taking the P-H-T relationship, these P-values with the corresponding return period T result in water depths of 0.3 m, resp. 0.1 m. In FIG. 9 the same relationship is presented with different axis. It can be noted that, for example, a flood event with a return period of 10 years can only affect locations with P-values higher than 0.82, with water depths ranging up to 0.8 m. For a 100-year flood, this range varies from 0.0 m (P<0. 54) up to 2.2 m (P=1). To get additional information for this example about the mentioned relationship, a questionnaire was used where all flood people from Zurich, Munich and Armonk gave their best estimate of such a relationship between flood frequency, event return period and water depth. The results of this "expert view" are compared with the analytical relationship. The comparison shows that the analytical relationship is slightly more conservative than the estimates indicating that during the calibration work some smaller modifications to the relationship could be done.

It is clear that the system and method also allow the values to be verified and adapted for flood zones other than 100-year and 500-year. The proposed P-values can be e.g. as follows: (i) 50-year flood zone: P=0.69 (resulting water depth with 50-year flood event H=0.4 m); (ii) 250-year flood zone: P=0.45 (resulting water depth with 250-year flood event H=0.2 m); (iii) 25-year food zone: P=0.82 (resulting in water depth with 25-year flood event H=0.6 m). Based on the return periods of all events (in every second cell) and on the complete flood frequency map, the water depth distribution can be determined. In the example given here in 54% of all cases the water depth is below 50 cm.

As shown above for the example, a rather large area of North Carolina lies below 10 meters above sea level, and is potentially affected by storm surge events. The system and method described above is well adapted for riverfloods inland located higher than 10 meters above sea level, but along the coast the flood zones also include the risk of storm surge, and for this area it can be reasonable to use a specific model. Such differentiations can easily be included in the same way, and form part of the invention. For example, storm surge events can be included in the system and/or method. Another possibility would be to use the SLOSH (Sea, Lake and Overland Surges from Hurricanes) method, which is a method used by the National Hurricane Center (NHC) to estimate storm surge heights resulting from historical, hypothetical, or predicted hurricanes. The second model takes into account pressure, size, forward speed, track and winds, which could be obtained from TCart. Independently of the method and/or system used, some kind of storm surge frequency map should be developed in order to be consistent with the river flood event set. The storm surge event set would then also consist of return periods, where the events are "linked" to the corresponding TC events. For storm surge different P-H-T relationships as well as vulnerability curves must be defined. The relation between river floods and TCs is less evident. However also the correlations between the river floods and TCs can be considered. Here, it can be reasonable to perform a matching between the TC rainfall maps and the river flood return periods.

Further the system can comprise an cell arbitrator module 22 accting on at least on grid-based composition module 23 according to the avaraged probabilistic water depth values H. The grid-based composition module 23 can comprise at least an early warning system signaling flood risk in the appropriate cell 60/61. Also, the grid-based composition module 23 can comprise automated damage prediction systems and/or damage covering systems for land-based installations based upon at least the flood risk factors. The grid-based composition module 23 can comprise at least an optimization and/or control module for protection installation of technical and/or industrial facilities based upon at least the flood risk factors. To consider correlations caused by correlations the system comprises a linking module with at least one adaptable event factor providing the spatial and/or temporal correlations for the discharge measurements of different gauging stations 6/30/31/32. The gauging stations 6/30/31/32 comprise at least a sensor and/or measuring fixture to measure river water level parameters, based upon which riverwater level parameters the river discharge parameters are determined.

The system can be accessable over a network 51 by client nodes 40/41/42, in particular by mobile client nodes. The reference numerals 50 and 51 accordingly stand for the various heterogeneous networks, such as e.g. a wired LAN, i.e. a local fixed network, in particular also the PSTN (Public Switched Telephone Network), etc., a Bluetooth network, e.g. for installations in covered-over localities, a mobile radio network with GSM and/or UMTS, etc. or a wireless LAN. Therefore it is possible to integrate the system f.e. as a part of information and/or early warning system for third parties. To be understood as then client nodes 40/41/42 can be inter alia all possible so-called Customer Premise Equipment (CPE) intended for use at various network locations and/or in different networks. Therefore the client nodes 40/41/42, illustrated schematically in FIG. 1, can be a mobile radio telephone 40 or a laptop-42, palmtop 41 or PDA-41 computer (Personal Data Assistant) equipped to communicate over the network 51, in particular a mobile radio network. The client nodes 40/41/42 possess one or more different physical network interfaces, which can also support a plurality of different network standards. The physical network interfaces of the client nodes 40/41/42 can comprise e.g. interfaces for Ethernet or for another wired LAN (Local Area Network), Bluetooth, GSM (Global System for Mobile Communication), GPRS (Generalized Packet Radio Service), USSD (Unstructured Supplementary Services Data), UMTS (Universal Mobile Telecommunications System) and/or WLAN (Wireless Local Area Network), etc. The client nodes 40/41/42 can include an identification module, preferably a chipcard fixed or removably connected to the client nodes 40/41/42, preferably a so-called SIM-card (Subscriber Identification Module). The identification module contains an identification data element, for example an International Mobile Subscriber Identity (IMSI). Furthermore, the client nodes 40/41/42 can include a data store, preferably located on the chipcard, which can be used as an account to store monetary amounts. The system can comprise at least one billing module with a billing gateway interface for access to the central unit 20 first call datail records of a client node being transmittable from the central unit 20 to the billing module. By means of a proxy module of the system second call detail records of the client node 40/41/42 are downloadable from the central unit 20 by means of the proxy module at least the identity of the client node and/or duration of the access to the central unit 20 and/or service being able to be captured and able to be passed on to the billing module. By means of the billing module of the system TAP files corresponding to the obtained service can be generated, an these can then be transmitted, together with billing instructions, to a clearing module, the billing instructions including at least user-specific and/or service-provider-specific billing data.

Although the present disclosure has been described with reference to particular means, materials and embodiments, one skilled in the art can easily ascertain from the foregoing description the essential characteristics of the present disclosure, while various changes and modifications may be made to adapt the various uses and characteristics without departing from the spirit and scope of the present invention as set forth in the following claims.

| List of References | |
|---|---|
| 1 | 50-y flood zone |
| 2 | 100-y flood zone |
| 3 | 500-y flood zone |
| 4 | River |
| 5 | Gauging station |
| 6/7 | loss in relation to the frequency |
| 20 | Central unit |
| 201 | Database |
| 202 | Database |
| 203 | Lookup table |
| 21 | Correlation-module |
| 22 | Cell arbitrator module |
| 23 | Grid-based composition module |
| 30/31/32 | Gauging station |
| 40/41/42 | Network node |
| 50/51 | Network |
| 60/61 | Grid Cell |
| H | Averaged water depth value |
| T | River discharge parameter |

The invention claimed is:

1. A signaling system for automated location-dependent recognition of flood risks, comprising:
    a central unit including a multi-dimensional lookup table corresponding to a spatial high resolution grid of a specific geographic territory, flood risk factors being associated with the grid and indicating an average flood frequency and/or susceptibility to flooding within a grid cell, the flood risk factors being calculated based on flood zone data associated with the specific geographic territory, the flood zone data indicating in the specific geographic territory flood zones with defined return periods,
    distributed gauging stations configured to determine river discharge parameters within an area of multiple grid cells of the grid and to transmit the river discharge parameters over a network to the central unit, the river discharge parameters comprising at least values for a return period as a measure of intensity of flood events,
    the central unit comprising a correlation-module configured to generate an event-specific average probabilistic water depth value for a flood event based on the linked flood risk factors and the river discharge values, and to associate the probabilistic water depth value with the corresponding grid cell, and
    a cell arbitrator module acting on at least one grid-based composition module according to the average probabilistic water depth values.

2. A system according to claim 1, characterized in that the grid-based composition module comprises at least an early warning system signaling flood risk in the appropriate cell.

3. A system according to claim 1, characterized in that the grid-based composition module comprises automated damage prediction systems and/or damage covering systems for land-based installations based upon at least the flood risk factors.

4. A system according to one of the claims 1 to 3, characterized in that the grid-based composition module comprises at least an optimization and/or control module for protection installation of technical and/or industrial facilities based upon at least the flood risk factors.

5. A system according to claim 1, further comprising:
    a linking module with at least one adaptable event factor providing spatial and/or temporal correlations for the discharge measurements of different gauging stations.

6. A system according to claim 1, wherein the gauging stations comprise at least a sensor and/or measuring fixture to determine the river discharge parameters.

7. A system according to claim 1, wherein the gauging stations measuring the river discharge parameters are located in a low spatial resolution in relation to the grid of the flood risk factors.

8. A system according to claim 1, wherein the gauging stations measuring the river discharge parameters are set to a high temporal resolution.

9. A system according to claim 1, wherein the resolution of the grid of the flood risk factors is given by cell sizes below 10,000 m$^2$.

10. A system according to claim 1, wherein the flood risk factors are derived based upon at least geomorphologic parameters.

11. A system according to claim 10, wherein the geomorphologic parameters comprise horizontal distance and/or elevation difference to the next river.

12. A system according to one of the claims 10 and 11, wherein the geomorphologic parameters comprise horizontal distance and/or elevation difference to the next drainage area.

13. A system according to claim 1, wherein the central unit comprises an interpolation module deriving the flood risk factors based upon a country-specific flood zone table depending on horizontal distance and/or elevation difference.

14. A system according to claim 13, wherein the country specific flood zone table comprises the First American 100-year flood zone table.

15. A system according to claim 1, wherein the correlation module comprises at least five adaptable correlation parameters $x_1, x_2, \ldots, x_5$, and the adaptable parameters are correlated by $$H = \max\left(\frac{x_1 P - x_2 + x_3 \ln(T)}{x_4 P + x_5}, 0\right).$$

wherein
    H denotes the average probabilistic water depth values,
    P denotes the flood risk factors, and
    T denotes the river discharge parameters.

16. A system according to claim 1, wherein vulnerability factors are determined based upon historical dataset of corresponding portfolios and a generalized insurance risk is automated derivable from the vulnerability factors.

17. A system according to claim 1, wherein the system comprises different correlation modules for flood cell zones along a coast located different height m a.s.l.

18. A system according to claim to 17, wherein the system comprises at least one specific correlation module determining flood cell zones along a coast located lower than 10 m a.s.l.

19. A system according to one of claims 17 and 18, wherein the determination of the flood cells along a coast are additionally based upon storm surge events.

20. A system according to claim 17, wherein the determination of the flood cells along a coast additionally comprises a Sea, Lake and Overland Surges from Hurricanes (SLOSH) method.

21. A system according to claim 1, wherein the system is accessible over a network by client nodes, the system further comprises a billing module with a billing gateway interface for access to the central unit first call detail records of a client node being transmittable from the central unit to the billing module.

22. A system according to claim 21, further comprising a proxy module for downloading second call detail records of the client node from the central unit at least the identity of the client node and/or duration of the access to the central unit and/or service being able to be captured and able to be passed on to the billing module.

23. A system according to claim 22, characterized in that by means of the billing module of the system TAP files corresponding to the obtained service are able to be generated, and these are transmittable, together with billing instructions, to a clearing module, the billing instructions including at least user-specific and/or service-provider-specific billing data.

24. A method for automated location dependent recognition of flood risks, comprising:
    generating a spatial high resolution grid for a specific geographic territory and flood risk factors, the flood risk factors being calculated based on flood zone data associated with the specific geographic territory and indicating the average flood frequency and/or susceptibility to flooding within a grid cell, the flood zone data indicating in the specific geographic territory flood zones with defined return periods;

determining river discharge parameters distributed gauging stations, the river discharge parameters comprising at least values for a return period as a measure of intensity of flood events; and linking the flood risk factors and the river discharge parameters by a correlation module to generate an event-specific averaged probabilistic water depth value for a flood event, the probabilistic water depth value being associated with the corresponding grid cell.

25. A method according to claim 24, wherein at least one adaptable event factor provides spatial and/or temporal correlations for discharge measurements of different gauging stations.

26. A method according to claim 24, wherein river water level parameters are measured by the gauging stations based upon which river water level parameters are determined.

27. A method according to claim 24, wherein the river discharge parameters are measured and/or determined in a low spatial resolution in relation to the grid of the flood risk factors.

28. A method according to claim 24, wherein the river discharge parameters are measured and/or determined in a high temporal resolution.

29. A method according to claim 24, wherein the resolution of the grid is given by cell sizes below 10,000 m².

30. A method according to claim 24, wherein the flood risk factors are derived based upon at least geomorphologic parameters.

31. A method according to claim 30, wherein the geomorphologic parameters comprise horizontal distance and/or elevation difference to the next river.

32. A method according to one of the claims 30 and 31, wherein the geomorphologic parameters comprise horizontal distance and/or elevation difference to the next drainage area.

33. A method according to claim 24, wherein the flood risk factors are derived by an interpolation module based upon a country-specific flood zone table depending on horizontal distance and/or elevation difference.

34. A method according to claim 33, characterized in that the country specific flood zone table comprises the First American 100-year flood zone table.

35. A method according to claim 24, wherein the correlation module comprises at least five adaptable correlation parameters $x_1, x_2, \ldots, x_5$, and the adaptable parameters are correlated by $$H = \max\left(\frac{x_1 P - x_2 + x_3 \ln(T)}{x_4 P + x_5}, 0\right).$$

wherein
H denotes the average probabilistic water depth values,
P denotes the flood risk factors, and
T denotes the river discharge parameters.

36. A method according to claim 24, wherein vulnerability factors are determined based upon historical dataset of corresponding portfolios and a generalized insurance risk is automated derivable from the vulnerability factors.

37. A method according to claim 24, wherein different correlation modules are used for flood cell zones along a coast located different height m a.s.l.

38. A method according to claim to 37, wherein flood cell zones along a coast located lower than 10 m a.s.l. are determined by a specific correlation module.

39. A method according to one of claims 37 and 38, wherein the determination of the flood cells along a coast are additionally based upon storm surge events.

40. A method according to claim 37, wherein the determination of the flood cells along a coast additionally comprises a Sea, Lake and Overland Surges from Hurricanes (SLOSH) method.

* * * * *